United States Patent [19]

Shirahata et al.

[11] 4,072,781
[45] Feb. 7, 1978

[54] MAGNETIC RECORDING MEDIUM

[75] Inventors: Ryuji Shirahata; Masaaki Suzuki; Tatsuji Kitamoto, all of Odawara, Japan

[73] Assignee: Fuji Photo Film Co., Ltd., Minami-ashigara, Japan

[21] Appl. No.: 628,431

[22] Filed: Nov. 3, 1975

[30] Foreign Application Priority Data

Nov. 1, 1974 Japan ............................. 49-126364

[51] Int. Cl.$^2$ ............................................. B05D 5/12
[52] U.S. Cl. ........................... 428/336; 360/131; 427/132; 427/304; 427/305; 427/306; 428/446; 428/457; 428/458; 428/461; 428/463; 428/900
[58] Field of Search ............. 427/132, 304, 305, 306, 427/127; 428/336, 446, 451, 900, 457–463, 450, 454; 106/1; 360/174, 174.1, 134, 131

[56] References Cited

U.S. PATENT DOCUMENTS

| 3,370,979 | 2/1968 | Schmeckenbecher | 427/132 |
|---|---|---|---|
| 3,385,725 | 5/1968 | Schmeckenbecher | 427/132 |
| 3,470,020 | 9/1969 | Boudreaux et al. | 427/132 |
| 3,525,638 | 8/1970 | Archey | 427/132 |
| 3,531,322 | 9/1970 | Kefalas et al. | 427/132 |
| 3,595,630 | 7/1971 | Wilhelm et al. | 427/132 |
| 3,625,849 | 12/1971 | Rogalla | 427/132 |
| 3,702,263 | 11/1972 | Hall et al. | 427/132 |

FOREIGN PATENT DOCUMENTS 1,295,953  5/1969  Germany ........................... 427/306

Primary Examiner—Thomas J. Herbert, Jr.
Assistant Examiner—Bruce H. Hess
Attorney, Agent, or Firm—Sughrue, Rothwell, Mion, Zinn and Macpeak

[57] ABSTRACT

The magnetic recording medium comprising a nonmagnetizable base having provided thereon a magnetizable layer by electroless plating, said magnetizable layer containing at least one ferromagnetic metal, phosphorus and at least one of copper, lead and silicon.

7 Claims, No Drawings

MAGNETIC RECORDING MEDIUM

BACKGROUND OF THE INVENTION

1. Field of the Invention

The present invention relates to a magnetic recording medium comprising a non-magnetizable base having provided thereon a magnetizable layer by electroless plating and, more particularly, to a magnetic recording medium containing a magnetizable metal layer having improved magnetic properties as compared with a conventional magnetizable layer formed by electroless plating.

2. Description of the Prior Art

Ferromagnetic metal films formed by electroplating, electroless plating, sputtering, vacuum plating, ion plating or the like have been termed binder-free magnetic recording mediums (no binder is used) as opposed to conventional magnetic recording mediums of the type which are prepared by dispersing a powdery magnetic material, e. g., $\gamma$-$Fe_2O_3$, Co-doped $\gamma$-$Fe_2O_3$, $Fe_3O_4$, $CrO_2$ or a ferromagnetic alloy, in an organic binder and coating the same on a support.

As one procedure for forming a magnetic recording medium for use in recording at high density, it has been proposed to enhance the coercive force and reduce the thickness. There has thus been the expectation that binder-free magnetic recording mediums wherein a reduction in thickness by one order of magnitude as compared with a coating-type magnetic recording medium can be obtained, and which show high saturation magnetic flux density, might be useful for high density recording, and various efforts have been made to put such a magnetic recording medium into practical use.

Electroless plating has the particular merits that it enables one to form a magnetizable layer on a non-conductive base, and facilitates the formation of a uniform magnetizable layer which has a very good adhesion to a base and which has excellent magnetic properties.

In the present specification, electroless plating means a chemical reduction plating wherein metal ions to be plated are reduced with a reducing agent in a plating solution to thereby deposit the metal on a base.

In order to initiate and accelerate the above-described reduction reaction only at the surface of the base, it is generally preferred to impart catalytic activity to the base surface through a pretreatment. For example, in the case of forming a magnetizble plating layer on a plastic base, the steps of degreasing—etching—activating the base surface—electroless plating are usually involved (see U.S. Pat. Nos. 3,245,826, 3,353,986, etc.). Degreasing and etching are conducted to form a uniform magnetizable plating layer on the base with good adhesion. These two steps can also be effected with one solution, for example, a degreasing-etching solution such as aqueous caustic soda solution or a mixture of dichromic acid and sulfuric acid.

One widely used process for activating a base surface involves sensitizing using a sensitizer solution comprising a $SnCl_2$ solution adjusted to the acidic side with hydrochloric acid, as shown in U.S. Pat. No. 2,702,253, and a subsequent activating using an activator solution containing noble metal ions such as Pd, Au, Ag or the like. A base surface subjected to this processing has adhered thereto fine particles of Pd, Au, Ag, etc., which function as a catalyst for the plating reaction.

There has also been used the process for activating a base surface as described in U.S. Pat. Nos. 3,011,920, 3,532,518, etc., which comprises processing with a Pd-Sn colloidal solution (catalyst processing) and then a processing with an accelerator solution.

Further, there are special processings for activating a base surface such as adhering catalytic metal fine particles to a base surface by vacuum deposition or the like, dispersing catalytic metal fine particles in an organic binder and coating the dispersion on a base surface, and providing a catalytic metal salt-containing layer on a base surface and converting the catalytic metal salt to a catalytic metal with a reducing agent. Any of the above pre-treatments can be used in the present invention, if desired, as this is not a critical or mandatory feature of the invention.

As an electroless plating bath for forming a magnetizing layer with high residual magnetic flux density and high coercive force, a bath containing cobalt ions or cobalt ions and nickel ions as magnetic metal ions and hypophosphite ions as a reducing agent is well known (see U.S. Pat. Nos. 3,116,159, 3,219,471, etc.). An electrolessly plated magnetizable film formed with these plating baths contains a small amount of P, and the high coercive force has been attributed to the precipitation of P on Co or on Co-Ni grain boundaries. The coercive force of a Co-P or Co-Ni-P magnetizable film prepared by conventional electroless plating has been reported to reach as high as 300 Oe or more, e. g., up to 1,500 Oe.

According to experiments of the inventors, the coercive force greatly depends upon the thickness of the magnetizable plating film, i. e., if the film thickness is low, the coercive force is high. In the case of, e.g., a Co-P film formed according to a conventional process, there is obtained a coercive force of only 700 Oe at the most when the film thickness is 0.15 m$\mu$, which thiness is necessary to obtain sufficient output as a magnetic recording medium.

The present invention was developed in order to remove the above-described defects encountered with conventional processes.

SUMMARY OF THE INVENTION

It is one object of the present invention to provide a magnetic recording medium of high coercive force and high residual flux density.

Another object of the present invention is to provide a novel magnetic recording medium comprising a non-magnetizable support having provided thereon a magnetizable electroless plating layer with improved magnetic properties, as compared with conventional electroless plating layers.

As a result of various investigations on magnetic recording mediums prepared by electroless plating, the inventors discovered that the above objects can be attained by a magnetic recording medium comprising a magnetizable metal layer containing cobalt, cobalt-nickel or a like ferromagnetic metal as a major component, phosphorus, and a small amount of copper, lead or silicon, the magnetizable layer being provided by electroless plating.

DETAILED DESCRIPTION OF THE INVENTION

The present invention provides a magnetic recording medium comprising a conventional non-magnetizable base such as plastic, glass, ceramic, etc., having formed thereon a magnetizable metal layer by electroless plating, said magnetizable metal layer containing a ferromagnetic metal, preferably cobalt or cobalt-nickel, phosphorus and any of copper, lead or silicon.

Such a magnetizable metal layer can be formed using a plating bath prepared by adding copper, lead or silicon ions in a small amount to a conventional electroless plating bath containing hypophosphite ion (phosphinate ion) as a reducing agent.

The components which compose the electroless plating bath are typically (1) metal ions to form metal plating layer, typically supplied from inorganic and organic metal salts; (2) reducing agents to provide the metal on the support by reducing the metal ions (the reducing agents must have an oxidation-reduction potential which enables them reduce the metal ions being plated); (3) complexing agents to complex the metals to prevent a precipitate of the metal ions with by-products during electroplating or hydroxides of the metal ion (the complexing agents are selected by considering their dissociation constant and reactivity); (4) a pH-buffer to prevent pH changes since plating properties change according to the pH during plating (generally, a weak acid and/or an alkali metal salt of the weak acid is used); (5) a pH adjusting agent to adjust the pH of plating solution (typically inorganic acids, ammonia and so on are used); (6) conventional additive, such as an accelerator to accelerate plating, a stabilizer to extend the life of the plating bath, a luster improving agent to give luster to the plating layer, a wetting agent to wet the support, additives to improve the properties of the plated layer, and the like can be added, if desired.

Usually, the amounts of the ions used in the plating bath are:

| | |
|---|---|
| Cobalt ions: | about 0.01 - about 1.2 mole/liter; |
| Nickel ions: | 0 - about 0.05 mole/liter; |
| Phosphinate (hypophosphite) ions: | about 0.01 - about 0.8 mole/liter. |

Plating is typically at atmospheric pressure and plating time, while dependant on several parameters, is generally about 15 seconds to about 15 minutes.

Any electroless plating system of the present invention requires: (1) ferromagnetic metal ions such as Co, Co+Fe, Co+Ni+Fe and the like; (2) a phosphinate as a reducing agent; and (3) Cu, Pb and/or Si ions.

Generally, about 0.05 - 1.7 mole/liter of a complexing agent is a highly preferred, but optional, additive.

The electroless bath usually contains: (1) ions of a metal(s) such as cobalt, nickel, iron or the like for forming a ferromagnetic metal film; (2) a reducing agent such as phosphinic acid (hypophosphinic acid), sodium hypophosphite, potassium hypophosphite, sodium borohydride, diethylamine borane, methyl diborane, hydrazine, hydrazine hydrate, hydrazine hydrochloride, formalin, hydrosulfite, solium dithionate, etc.; (3) a complexing agent such as malonic acid, succinic acid, tartaric acid, citric acid, ammonium salt, etc.; (4) a pH-buffer such as formic acid, acetic acid, malonic acid, succinic acid, citric acid, etc.; (5) a pH-adjusting agent such as sodium hydroxide, ammonium hydroxide, carbonate, etc., and the like.

A specific example of an electroless plating bath preferred for use in the present invention is an aquious solution containing a cobalt compound which provides 0.02 - 0.6 mole/liter of cobalt ion, a nickel compound which provides 0 - 0.02 mole/liter of nickel ion, a iron compound which provides 0 - 0.005 mole/liter of iron ion, a hypophoshite compound (as a reducing agent) in an amount of 0.03 - 0.4 mole/liter and copper ions, lead ions and/or silicons ion in an amount of 0.001 to 0.003 mole/liter, which range applies to individual material, i.e., if all of Cu, Pb and Si are present each, e.g., a total maximum of 0.009 mols of these component(s) could be present. The concentration of the compound of copper, lead or silicon in the plating bath is selected so that the content of copper, lead or silicon in the resulting plating film becomes about 0.05 - 0.1 wt %, which varies depending upon the kind of the plating solution. The thus formed magnetizable metal layer contains not less than about 50 wt % cobalt, about 50 wt % or less nickel, about 0.5 to about 10 wt % phosphorus and about 0.05 to about 1.0 wt % of at least one of copper, lead and silicon (this range applying to each of copper, lead and silicon so that, for example, when all three are used about 3.0 wt % could be present).

The primary ferromagnetic materials used in the present invention are Co, Co-Ni, Co-Fe, Co-Ni-Fe.

General ranges and preferred ranges in the magnetizable layer are as follows:

| | | General Range | Preferred Range |
|---|---|---|---|
| Co : Co | | about 50 wt % or more | 70 wt % or more |
| Co—Ni : | Co | about 50 wt % or more | 70 wt % or more |
| | Ni | 0 - about 50 wt % | 0 - 40 wt % |
| Co—Fe : | Co | about 50 wt % or more | 70 wt % or more |
| | Fe | 0 - about 30 wt % | 0 - 15 wt % |
| Co—Ni—Fe : | Co | about 50 wt % or more | 70 wt % or more |
| | Ni | 0 - about 50 wt % | 0 - 40 wt % |
| | Fe | 0 - about 30 wt % | 0 - 15 wt % | based on the weight of the final plating film.

The above-described plating bath preferably has a pH of about 6.5 to about 9.0 since hypophosphite is used as a reducing agent, and preferably is used at a temperature of about 60° to about 95° C in order to allow plating to proceed rapidly.

If desired, the above-described complexing agent, pH-adjusting agent and pH buffer can be incorporated in the aqueous plating bath.

In the present invention, it is preferred that the plating rate generally be 50 A/min – 5,000 A/min, particularly preferably 200 A/min – 2,000 A/min.

As compounds supplying cobalt ions, there are, e.g., 1- to 4-valent compounds of cobalt such as inorganic salts, inorganic acid salts, organic acid salts, complex salts, etc. Specific example includes cobalt chloride, cobalt sulfate, cobalt nitrate, cobalt bromide, cobalt fluoride, cobalt iodide, cobalt perchlorate, cobalt acetate, cobalt benzoate, hexamminecobalt chloride, hexamminecobalt nitrate, hexamminecobalt sulfate, aquopentamminecobalt chloride, ethylenediaminecobalt chloride, cobalt ammonium sulfate, potash alum [KCo(SO$_4$)$_2$. 12H$_2$O], cesium hexafluorocobalt, heteropolyacid salt (3K$_2$O.CoO$_2$,9MoO$_3$.6.5H$_2$O), cobalt aluminate, cobalt arsenide, cobalt L-aspartate, cobalt borate, cobalt carbide, cobalt carbonyl, platinum cobalt chloride, cobalt cyclohexanebutyrate, cobalt 2-ethylhexoate, cobalt fluoroboride, cobalt fluorosilicide, cobalt formate, cobalt gluconate, cobalt glycine, cobalt hydroxide, cobalt molybdate, cobalt lactate, cobalt laurate, cobalt naphthenate, cobalt nitride, cobalt oleate, cobalt arsenate, cobalt boride, cobalt chromate, cobalt citrate, cobalt cyanide, cobalt ferrocyanide, cobalt hexachlorostannate, cobalt oxalate, cobalt phosphate, cobalt phosphite, cobalt selanate, cobalt selenite, cobalt sulfamate, cobalt thiocyanate, potassium cobalt oxalate, cobalt selenide, cobalt silicate, cobalt fluorosilicate, cobalt stannate, cobalt titanate, cobalt tungstate, and the like.

Of these, the chloride, sulfate, nitrate, bromide, fluoride, iodide, perchlorate, acetate, benzoate, hexamminechloride, hexamminenitrate, hexamminesulfate, aquopentamminechloride, ethylenediamine chloride salt and ammonium sulfate salt are particularly preferred.

As compounds capable of providing nickel ions, there are the 1- to 4-valent nickel compounds of inorganic salts, inorganic acid salts, organic acid salts, complex salts, etc. Specific examples include nickel chloride, nickel sulfate, nickel nitrate, nickel bromide, nickel iodide, nickel perchlorate, nickel hypophosphite, nickel selenate, nickel formate, nickel benzenesulfonate, nickel diaquotetramminesulfate, nickel hexammine chloride, ammonium nickel sulfate, sodium nickel carbonyl (Na$_2$[Ni$_4$(Co)$_9$]), nickel ferricyanide, nickel ferrocyanide, nickel hydroxide, nickel periodate, [NiCl$_2${P(C$_6$H$_5$)$_3$}$_2$], [NiP{C$_3$H$_8$As(CH$_3$)$_2$}$_3$(CN)]+, LiNiO$_2$, K$_3$[NiF$_6$[, K$_2$[NiF$_6$], [Ni{(CH$_3$)$_a$AsC$_6$H$_4$As(CH$_3$)$_2$}$_2$]Cl, heteropolyacid salt (3BaO.NiO$_2$. 9MoO$_3$. 12H$_2$O), nickel aluminate, aluminum nickel chloride, nickel antimonate, nickel arsenate, nickel arsenide, nickel benzoate, bisdiphenylphosphite nickel carbonyl, nickel borate, nickel bromate, nickel carbide, nickel carbonyl, nickel palladium chloride, nickel chloroplatinate, nickel citrate, nickel cyclohexanebutyrate, nickel cyclopentamethylenedithiocarbamate, nickel dibutyldithiocarbamate, nickel ethylenediaminesulfate, nickel lactate, nickel naphthenate, nickel acetate, nickel fluoroborate, nickel oxalate, nickel pentamethylenedithiocarbamate, nickel phosphate, nickel phosphite, potassium nickel cyanide, potassium nickel fluoride, potassium nickel sulfate, nickel selenide, nickel fluorosilicide, nickel sulfamate, nickel tartrate, nickel telluride, tetramminenickel nitrite, nickel thiocyanate, nickel titanate, nickel tungstate, etc.

Of these, the chloride, sulfate, nitrate, bromide, iodide, perchlorate, hypophosphite, selenate, formate, benzenesulfonate, diaquotetrammine nitrate salt, hexammine chloride salt, and ammonium sulfonate salt of nickel are particularly preferred.

As compounds capable of providing iron ions, these are the divalent or trivalent iron compounds of inorganic salts, inorganic acid salts, organic acid salts, complex salts, etc. Specific examples include ferrous chloride, ferrous perchlorate, ferrous sulfate, ferrous ammonium sulfate, ferrous nitrate, ferrous bromate, ferrous iodate, ferric chloride, ferric perchlorate, ferric sulfate, ferric ammonium sulfate, ferric nitrate, ferric bromate, ferric iodate, ferrous oxalate, ferric oxalate, ferrous hydroxide, ferric hydroxide, ferrous carbonate, ferric carbonate, etc.

Of these, the chloride, sulfate, nitrate and ammonium sulfate of iron are particularly preferred.

As compounds capable of providing hypophosphite ion (phosphinate ion), [PH$_2$O$_2$]$^2$ $^-$, there are hypophosphites and, more specifically, there are illustrated ammonium hypophosphite, sodium hypophosphite, magnesium hypophosphite, aluminum hypophosphite, potassium hypophosphite, calcium hypophosphite, manganese hypophosphite, iron hypophosphite, cobalt hypophosphite, nickel hypophosphite, zinc hypophosphite, uranyl hypophosphite, and the like.

When an iron, cobalt, nickel, etc., hypophosphite is used. The metal cation thereof is considered as part of the metal ions present. Accordingly, the amount of metal salt used can be lowered.

Of these, the ammonium salt, sodium salt, magnesium salt, potassium salt and calcium salt are particulary suitable.

As the copper compounds used in the present invention, there can be illustrated copper acetate, copper acetylide, hexamminecopper chloride, tetramminecopper 2-thionate, tetramminecopper nitrate, tetramminecopper sulfate, copper benzoate, copper metaborate, copper bromate, copper bromide, copper butyrate, copper chlorate, copper perchlorate, copper chloride, thiourea copper chloride, copper dichromate, copper fluoride, copper fluorosilicate, copper formate, copper iodide, copper lactate, copper laurate, copper nitrate, copper oxalate, copper orthophosphate, pyridine copper chloride, copper salicylate, copper selenate, copper sulfate, copper sulfide, copper sulfite, copper tartrate, copper thiocyanate, copper tungstate, copper ammonium chloride, etc.

As the lead compound used in the present invention, there can be illustrated lead acetate, lead orthoarsenate, lead metaborate, lead bromate, lead bromide, lead carbonate, lead chlorate, lead perchlorate, lead chloride, lead chlorite, lead citrate, lead cyanide, lead cyanate, lead enanthylate, lead ethylsulfate, lead ferricyanide, lead fluoride, lead chlorofluoride, lead fluorosilicate, lead formate, lead hydroxide, lead iodate, lead iodide, lead lactate, lead laurate, lead myristate, lead nitrate, lead nitrite, lead oxalate, lead oxide, lead oxychloride, lead palmitate, lead phenolsulfate, lead phosphate, lead picrate, lead stearate, lead sulfate, lead peroxysulfate, lead sulfide, lead tartrate, lead 2-thionate, lead thiosulfate, lead thiocyanate, lead tungstate, lead metavanadate, ammonium chloroplumbate, and the like.

As the silicon compound used in the present invention, there can be illustrated barium fluorosilicate, barium silicate, calcium fluorosilicate, calcium silicate, cesium fluorosilicate, ammonium fluorosilicate, copper fluorosilicate, lead fluorosilicate, cobalt fluorosilicate, iron fluorosilicate, lithium fluorosilicate, magnesium fluorosilicate, manganese fluorosilicate, silicomolybdic acid, potassium fluorosilicate, potassium silicate, potassium silicotungstate, rubidium fluorosilicate, silicotungstic acid, silver fluorosilicate, sodium fluorosilicate, sodium silicate, sodium silicotungstate, strontium fluorosilicate, thallium fluorosilicate, zinc fluorosilicate, etc.

When an iron, cobalt, nickel, etc., silicate is used. The metal cation thereof other than silicon is considered as part of the metal ions present. Accordingly, the amount of metal salt used can be lowered.

A magnetizable layer containg ferromagnetic metal (e.g., cobalt), phosphorus, and at least one of copper, lead and silicon is typically formed using a plating solution prepared by dissolving in water the desired compounds selected from the above-described compounds together with a complexing agent, a pH buffer, a pH-adjusting agent, etc.

The thickness of the magnetizable film in the present invention is generally about 0.05 to about 2.0 μm, preferably 0.05 to 1.0 μm and most preferably 0.1 μm - 0.4 μm, considering the requirements of sufficient output as a magnetic recording medium and the capability to record at sufficiently high density.

As the non-magnetizable base upon which electroless plating is conducted in accordance with the present invention, any non-conductive base (e.g., polyethylene terephthalate, polyimide, polyvinyl chloride, cellulose triacetate, polycarbonate, polyethylene-2,6-naphthalate, glass, ceramic, etc.) or metal base (e.g., aluminum, brass, etc.) can be used. Further, a base prepared by forming a metal film on the abovedescribed bases by vacuum evaporation, for example, a metal layer of Ti, Al, Cu, Cr, etc., plating or the like, for example, electroplating, electroless plating and so on, or by coating an adhesive, e.g., nitrile gum, acrylic gum, epoxy resin, vinyl chrolide - vinyl acetate copolymer and the like, or the like on the base and adhering a metal film there may also be used as a base for plating.

The base can be in any desired form, i.e., a uniform magnetizable thin film can be formed on any of a tape, sheet, card, disk, drum or like form.

When the thickness of the magnetizable layer capable of providing sufficient output is, e.g., 0.2 $\mu m$, the magnetic recording medium in accordance with the present invention can show a squareness ratio (Br/Bm) of 0.85 and a coercive force (Hc) as high as 950 Oe, and is suitable for high density recording, and has greatly improved properties as compared with a conventional electroless plating magnetic recording medium.

The present invention will now be illustrated in detail by several Examples which, however, are not to be taken as limiting the present invention in any way. Unless otherwise indicated, all processings were conducted at atmospheric pressure and all weight percents, ratios and parts are by weight.

EXAMPLE 1

A 25 $\mu m$-thick polyethylene terephthalate film was immersed for 10 minutes in an aqueous solution containing 200 g/liter of sodium hydroxide at 80° C to degrease the film and etch the same, and after washing with water, it was activated using the following solution.

| | |
|---|---|
| Sensitizer solution: | (in 1 liter) |
| $SnCl_2.2H_2O$ | 30 g |
| HCl | 10 ml |
| Activator solution: | (in 1 liter) |
| $PdCl_2$ | 0.75 g |
| HCl | 10 ml |

After being immersed in the sensitizer solution for 2 minutes at 18° – 25° C, the film was washed with distilled water and then immersed in the activator solution for 1 minute. After washing with distilled water, electroless plating was conducted using a plating bath composition (formed by dissolving each component in water) as shown in the following Table 1-A. In every case, plating was conducted until the film thickness reached 0.2 $\mu m$ in order to compare magnetic properties.

Table 1-A

| Sample No. | Base Bath (g/liter) | | Additional Metal Compound (g/liter) |
|---|---|---|---|
| 1 | Cobalt Sulfate ($CoSO_4 . 7H_2O$) | 30.9 | none |
| 2 | Sodium Hypophosphite ($NaH_2PO_2H_2O$) | 9.5 | Copper Sulfate ($CuSO_4$) 0.16 |
| 3 | Ammonium Sulfate (($NH_4)_2SO_4$) | 66.0 | Lead Sulfate ($PbSO_4$) 0.05 |
| 4 | Potassium Sodium Tartrate ($NaKC_4H_4O_6 . 4H_2O$) pH: 8.5; 75° C* | 96.0 | Sodium Silicate ($Na_2Si_2O_6$) 0.18 |
| 5 | Cobalt Chloride ($CoCl_2 . 6H_2O$) | 7.5 | none |
| 6 | Sodium Hypophosphite ($NaH_2PO_2.H_2O$) | 3.6 | Cupric Chloride ($CuCl_2$) 0.13 |
| 7 | Ammonium Chloride ($NH_4Cl$) | 12.5 | Lead Chloride ($PbCl_2$) 0.28 |
| 8 | Citric Acid ($H_3C_6H_5O_7 . H_2O$) Sodium Laurylsulfate ($C_{12}H_{25}OSO_3Na$) pH: 8.2; 80° C* | 17.9 0.1 | Sodium Silicate ($Na_2Si_2O_6$) 0.20 |
| 9 | Cobalt Sulfamate ($Co(NH_2SO_3)_2$) | 70.0 | none |
| 10 | Sodium Hypophosphite ($NaH_2PO_2 . H_2O$) | 15.0 | Copper Sulfate ($CuSO_4$) 0.08 |
| 11 | Ammonium Sulfate (($NH_4)_2SO_4$) | 15.0 | Lead Sulfate ($PbSO_4$) 0.05 |
| 12 | Sodium Acetate ($C_2H_3O_2Na . 3H_2O$) pH: 8.6; 80° C* | 15.0 | Sodium Silicate ($Na_2Si_2O_6$) 0.15 |
| 13 | Cobalt Sulfate ($CoSO_4 . 7H_2O$) | 17.5 | none |
| 14 | Sodium Hypophosphite ($NaH_2PO_2 . H_2O$) | 30.0 | Copper Sulfate ($CuSO_4$) 0.08 |
| 15 | Ammonium Sulfate (($NH_4)_2SO_4$) | 66.0 | Lead Sulfate ($PbSO_4$) 0.03 |
| 16 | Sodium Citrate ($Na_3C_6H_5O_7 . 2H_2O$) pH: 8.0; 85° C* | 35.0 | Sodium Silicate ($Na_2Si_2O_6$) 0.18 |

*Temperature given at the end of each series is the plating temperature; further, pH was adjusted by adding NaOH.
(Note: Each plating solution was prepared by dissolving the additional metal compound in the base bath.)

In Example 1, the plating time for each sample was shown in Table 1-B below.

Table 1-B

| Sample No. | Plating Time (min.) | Sample No. | Plating Time (min.) |
|---|---|---|---|
| 1 | 6.0 | 9 | 3.0 |
| 2 | 7.0 | 10 | 3.0 |
| 3 | 6.0 | 11 | 3.0 |
| 4 | 7.0 | 12 | 3.0 |
| 5 | 3.5 | 13 | 2.0 |
| 6 | 3.5 | 14 | 2.0 |
| 7 | 4.0 | 15 | 2.0 |

Table 1-B-continued

| Sample No. | Plating Time | Sample No. | Plating Time |
|---|---|---|---|
| 8 | 4.0 | 16 | 3.0 |

The results of analyzing the compositions of the formed plating films and the results of measuring the magnetic properties thereof are shown in Table 2-A.

Table 2-A

| Sample No. | Magnetic Properties | | | | | |
|---|---|---|---|---|---|---|
| | Composition (Weight Ratio taking Co weight as 100) | | | | Coercive Force | Squareness Ratio |
| | P | Cu | Pb | Si | Hc: (Oe) | (Br/Bm) |
| 1 | 5.4 | — | — | — | 425 | 0.78 |
| 2 | 5.3 | 0.3 | — | — | 535 | 0.79 |
| 3 | 5.8 | — | 1.0 | — | 570 | 0.80 |
| 4 | 6.5 | — | — | 0.2 | 495 | 0.78 |
| 5 | 8.8 | — | — | — | 435 | 0.73 |
| 6 | 8.3 | 1.2 | — | — | 520 | 0.78 |
| 7 | 9.2 | — | 0.9 | — | 490 | 0.79 |
| 8 | 9.3 | — | — | 1.1 | 505 | 0.79 |
| 9 | 4.5 | — | — | — | 695 | 0.66 |
| 10 | 4.2 | 0.7 | — | — | 830 | 0.81 |
| 11 | 4.3 | — | 0.5 | — | 955 | 0.78 |
| 12 | 4.5 | — | — | 0.8 | 905 | 0.77 |
| 13 | 4.7 | — | — | — | 550 | 0.67 |
| 14 | 4.5 | 0.6 | — | — | 615 | 0.77 |
| 15 | 5.1 | — | 0.2 | — | 595 | 0.78 |
| 16 | 4.8 | — | — | 1.0 | 605 | 0.77 |

As is shown above, the samples containing copper, lead or silicon in the electroless plating layer (containing cobalt as a major component; sample Nos. 2, 3, 4, 6, 7, 8, 10, 11, 12, 14, 15, 16) have a high coercive force and a high squareness ratio. Thus, there can be obtained magnetic recording mediums suitable for high density recording.

EXAMPLE 2

A surface of a 50 μm-thick polyethylene-2,6-naphthalate film was etched for 30 seconds by immersion in a processing solution of the following composition at 18° – 25° C.

| Potassium dichromate ($K_2Cr_2O_7$) | 15 g |
|---|---|
| Sulfuric acid ($H_2SO_4$) | 100 ml |
| Water | 50 ml |

After washing with water, the polyethylene-2,6-naphthalate film was immersed in base surface-activating solution, Catalyst F solution, and an Accelerator 19 solution, made by Shipley Co. of U.S.A. (2300 Washington St., Newton, Massachusetts), for 2.5 minutes each at 18° – 25° C to conduct activation. The base film was then subjected to plating at 18° – 25° C in a plating solution as given in Table 3-A until the plating film reached 0.12 μm in thickness.

Table 3-A

| Sample No. | Composition of Plating Bath | | |
|---|---|---|---|
| | Base Bath (g/liter) | Additional Metal Compound (g/liter) | |
| 17 | Cobalt Chloride ($CoCl_2 \cdot 6H_2O$) 14.2 | none | |
| 18 | Sodium Hypophosphite ($NaH_2PO_2 \cdot H_2O$) 10.6 | Copper Fluorosilicate ($CuSiF_4 \cdot 4H_2O$) | 0.20 |
| 19 | Ammonium Chloride ($NH_4Cl$) 10.7 | Lead Fluorosilicate ($PbSiF_6 \cdot 2H_2O$) | 0.20 |
| 20 | Citric Acid ($H_3C_6H_5O_7 \cdot H_2O$) 18.9 | Copper Tartrate ($CuC_4H_4O_6 \cdot 3H_2O$) | 0.15 |
| 21 | Boric Acid ($H_3BO_3$) 30.9 | Lead Citrate ($Pb_3(C_6H_5O_7)_2 \cdot 3H_2O$) 0.45 | |
| | pH: 7.3; 80° C | | |

In Example 2, the plating time for each sample was as shown in Table 3-B.

Table 3-B

| Sample No. | Plating Time (min.) |
|---|---|
| 17 | 3.0 |
| 18 | 3.0 |
| 19 | 3.0 |
| 20 | 3.0 |
| 21 | 3.5 |

The results of measuring the compositions and magnetic properties of the thus prepared samples are shown in Table 4.

Table 4

| Sample No. | Film Composition and Magnetic Properties | | | | | |
|---|---|---|---|---|---|---|
| | Composition (Weight Ratio taking Co Weight as 100) | | | | Coercive Force | Squareness Ratio |
| | P | Cu | Pb | Si | Hc: (Oe) | (Br/Bm) |
| 17 | 3.6 | — | — | — | 620 | 0.72 |
| 18 | 3.0 | 0.2 | — | 0.4 | 755 | 0.78 |
| 19 | 3.2 | — | 0.5 | 0.8 | 880 | 0.77 |
| 20 | 3.6 | 0.3 | — | — | 735 | 0.81 |
| 21 | 3.5 | — | 0.5 | — | 715 | 0.78 |

As is described above, samples containing one or more of copper, lead and silicon in an electroless plating layer comprising Co-phosphorus (sample Nos. 18, 19, 20 and 21) have a high coercive force and a high squareness ratio.

EXAMPLE 3

A 12 μm-thick polyethylene terephthalate film was immersed for 7 minutes in an aqueous solution containing 200 g/liter of sodium hydroxide at 80° C to thereby degrease and etch the same and, after being washed with water, was immersed for 5 minutes in the following catalyst solution (which is described in U.S. Pat. No. 3,011,920) at 18° – 25° C.

| Catalyst solution: | (per liter of water) |
|---|---|
| $PdCl_2$ | 1.0 g |
| $Na_2SnO_3 \cdot 3H_2O$ | 1.5 g |
| $SnCl_2 \cdot 2H_2O$ | 37.5 g |
| HCl | 300 ml |

The film was then immersed in an accelerator solution comprising 20% $HClO_4$ for 6 minutes at 18° – 25° C to activate the base surface, whereafter electroless plating was conducted in a plating solution as shown in Table 5 at 18° – 25° until the film thickness reached 0.3 μm.

Table 5

| Sample No. | Base Bath (g/liter) | | Additional Metal Compound (g/liter) |
|---|---|---|---|
| | Plating Solution Composition | | |
| 22 | Cobalt Chloride ($CoCl_2 \cdot 6H_2O$) | 11.9 | none |
| 23 | Nickel Chloride ($NiCl_2 \cdot 6H_2O$) | 0.35 | Cupric Chloride ($CuCl_2$) 0.03 |
| 24 | Sodium Hypophosphite ($NaH_2PO_2 \cdot H_2O$) | 4.2 | Lead Chloride ($PbCl_2$) 0.05 |
| 25 | Ammonium Chloride ($NH_4Cl$) | 12.8 | Potassium Silicate ($K_2Si_4O_6 \cdot H_2O$) 0.08 |
| | Citric Acid ($H_3C_6H_5O_7 \cdot H_2O$) | 18.9 | |
| | pH: 8.0; 78° C | | |
| 26 | Cobalt Chloride ($CoCl_2 \cdot 6H_2O$) | 30.9 | none |
| 27 | Nickel Chloride ($NiCl_2 \cdot 8H_2O$) | 4.8 | Cupric Chloride ($CuCl_2$) 0.05 |
| 28 | Sodium hypophosphite ($NaH_2PO_2 \cdot H_2O$) | 9.6 | Lead Chloride ($PbCl_2$) 1.12 |
| 29 | Sodium Citrate ($Na_3C_6H_5O_7 \cdot H_2O$) | 86.3 | Potassium Silicate ($K_2Si_4O_6 \cdot H_2O$) 0.15 |
| | pH: 7.5; 85° C | | |

The plating time in Example 3 is shown in Table 5-B.

Table 5-B

| Sample No. | Plating Time (min.) |
|---|---|
| 22 | 4.0 |
| 23 | 4.0 |
| 24 | 4.0 |
| 25 | 4.0 |
| 26 | 1.0 |
| 27 | 1.0 |
| 28 | 1.5 |
| 29 | 1.0 |

The compositions and the magnetic properties of thus formed plating films are shown in Table 6.

Table 6

| Sample No. | Composition and Magnetic Properties of Magnetizable Layer | | | | | | |
|---|---|---|---|---|---|---|---|
| | Composition (Weight Ratio taking Co Weight as 100) | | | | | Coercive Force | Squareness Ratio |
| | Ni | P | Cu | Pb | Si | Hc: (Oe) | (Br/Bm) |
| 22 | 5.6 | 2.8 | — | — | — | 355 | 0.71 |
| 23 | 5.5 | 2.6 | 0.3 | — | — | 430 | 0.75 |
| 24 | 5.5 | 2.8 | — | 0.1 | — | 445 | 0.78 |
| 25 | 5.5 | 2.7 | — | — | 0.2 | 440 | 0.77 |
| 26 | 11.3 | 4.1 | — | — | — | 415 | 0.74 |
| 27 | 11.5 | 4.0 | 0.4 | — | — | 685 | 0.79 |
| 28 | 11.4 | 3.9 | — | 0.3 | — | 715 | 0.81 |
| 29 | 11.4 | 4.0 | — | — | 0.3 | 690 | 0.83 |

It can be clearly seen that magnetic properties are markedly improved by incorporating at least one of copper, lead and silicon in a electroless plating layer comprising cobalt-nickel-phosphorus.

As is clear from the above Examples, a magnetizable layer containing 50 wt % or more cobalt, less than 50 wt % nickel, 0.5 to 10 wt % phosphorus and 0.05 – 1.0 wt % of at least one of copper, lead and silicon, formed by electroless plating, shows a high coercive force and a high squareness ratio, thus being extremely useful for forming a high density magnetic recording medium.

The above Examples show activating a base surface using a combination of a sensitizer solution - activator solution or a combination of a catalyst solution - accelerator solution. However, the present invention is not limited thereto, and other activating processings such as coating a catalytic metal on the base can serve to provide a similar magnetizable layer.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-mangetizable base having provided thereon a magnetizable layer formed by electroless plating, said magnetizable layer containing a ferromagnetic metal selected from the group consisting of Co, Co-Ni, Co-Fe and Co-Ni-Fe in amounts of greater than 50 wt. % Co, 0 to 50 wt. % Ni, 0 to 30 wt. % Fe based on the total weight of said manetizable layer; said magnetizable layer further containing phosphorus in an amount of 0.5 to 10 wt. % based on the total weight of the magnetizable layer and at least one member selected from the group consisting of copper, lead and silicone in an amount of 0.05 to 1.0 wt. % based on the total weight of said magnetizable layer.

2. The magnetic recording medium claimed in claim 1, wherein the magnetizable layer is about 0.05 to about 1.0 μm thick.

3. The magnetic recording medium claimed in claim 1, wherein said copper is present and is about 0.05 to 1.0 wt % of the total weight of said magnetizable layer.

4. The magnetic recording medium claimed in claim 1, wherein said lead is present and is about 0.05 to 1.0 wt % of the total weight of said magnetizable layer.

5. The magnetic recording medium claimed in claim 1, wherein said silicon is present and is about 0.05 to 1.0 wt % of the total weight of said magnetizable layer.

6. A process for producing a magnetic recording medium comprising a non-magnetic support and a magentizable layer on said support, said process comprising forming said magnetizable layer on said non-magnetic support by electroless plating using an electroless plating bath containing Co ions and metal ions selected from the group consisting of Ni, Fe and mixtures wherein said Co ions are present in an amount of 0.02 to 0.6 mole per liter, said Ni ions are present in an amount of 0 to 0.02 mol per liter and Fe ions are present in an amount of 0 to 0.005 mol per liter; said electroless plating bath further containing hypophosphite ion in an amount of 0.03 to 0.4 mol per liter and at least one member selected from the group consisting of copper ions, lead ions and silicone ions present in an amount of 0.001 to 0.003 mol per liter.

7. The process claimed in claim 6, wherein the electroless plating is about 6.5 to 9.0 in pH, about 60 to about 95° C in temperature, and a 50 to 5000 A/min. plating rate is used.

* * * * *